United States Patent
Dawson-Granados et al.

(10) Patent No.: US 7,421,657 B1
(45) Date of Patent: Sep. 2, 2008

(54) HANDLING OPEN BROWSER REQUESTS IN A SINGLE WINDOW ENVIRONMENT

(75) Inventors: David Dawson-Granados, Seattle, WA (US); Benjamin R. Peart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 09/712,064

(22) Filed: Nov. 14, 2000

(51) Int. Cl.
G06F 3/048 (2006.01)
G06F 17/30 (2006.01)
G06F 17/50 (2006.01)

(52) U.S. Cl. .................. 715/739; 715/238; 715/788; 715/804; 715/808

(58) Field of Classification Search ............ 345/808, 345/864, 738, 781, 730, 760, 962, 705, 764, 345/733, 740, 735; 705/14; 709/203; 715/238, 715/739, 788, 804, 808
See application file for complete search history.

(56) References Cited

U.S. PATENT DOCUMENTS

2002/0052925 A1* 5/2002 Kim et al. ................. 709/217

OTHER PUBLICATIONS

"How-To Beat the ADS on FWP (Free Webpage Providers)?" SmoG Alert Dec. 22, 1999: p. 1. [Online] Available http://packetstorm.trustica.cz/javascript/adkill-howto.hm Aug. 19, 2003.*

"Pop-ups", Siemens AG p. 1. [Online] Available http://www.siemens.com/ Aug. 18, 2003.*

Falkenburg, Steven. "WebFree" 1996-1997. [Online] Available http://www.falken.net/webfree/guide/guide.html.*

Lowery. Joe. Sams Teach Yourself Internet Explorer 4.0, 1998, Sams Publishing, pp. 20-22.*

* cited by examiner

Primary Examiner—Tadesse Hailu
Assistant Examiner—Namitha Pillai
(74) Attorney, Agent, or Firm—Lee & Hayes, PLLC

(57) ABSTRACT

In a single window browser environment, a request to open a new browser window is either allowed or ignored, depending on whether the request was generated in response to user input. The request is ignored if it was not generated in response to user input. If, on the other hand, the request was generated in response to user input, it is allowed. In such cases, in order to preserve the single window interface, the new browser window is opened as a full screen window that overlays the existing browser window. In certain implementations, the determination of whether or not a request was generated in response to user input is simplified by assuming that all requests that are generated during the loading or unloading of a page are not in response to user input and ought to be ignored. By contrast, window open requests that are generated at other times are assumed to be user-initiated and are allowed.

16 Claims, 3 Drawing Sheets

HANDLING OPEN BROWSER REQUESTS IN A SINGLE WINDOW ENVIRONMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2000, Microsoft Corp.

FIELD OF THE INVENTION

The invention relates generally to Internet browsers. More particularly, the invention relates to Internet appliances using a single window environment.

BACKGROUND

Internet appliances have become an increasingly popular tool for accessing the Internet. For some consumers who are only interested in browsing the Internet and communicating electronic mail (e-mail), Internet appliances offer a low-cost alternative to relatively expensive personal computers. This option also appeals to users who already own a personal computer and want a secondary device for Internet access, for example, from a different location in the home. For many users for whom personal computers can be intimidating, Internet appliances offer a relatively simple to use alternative.

One feature of Internet appliances that enhances ease of use is a single window environment. In such an environment, the user is presented with a single full screen browser window, as contrasted with the multiple window environment presented by other conventional Internet browsers. The single, full-screen window environment allows the user to begin using the system quickly without first having to learn about window manipulation, e.g., positioning and sizing of windows.

While a single window environment simplifies use, it also presents limitations that impair usability in certain circumstances. For example, standard HTML allows a web developer to cause new browser windows to pop up, breaking this simplified user model. This feature can be used to open new browser windows either in response to some action on the part of the user, or without such user action. For example, a web developer can cause a pop-up advertisement to appear upon loading (entering) or unloading (exiting) a web page. On the other hand, certain applications, such as web-based e-mail, open new browser windows in response to user input, e.g., clicking on an "address book" link.

Many conventional Internet appliances that use a single window environment simply ignore all requests to open new browser windows in order to preserve the single window interface. This approach, however, leaves the user with a degraded experience of the web in which many pages that are critical to performing useful tasks do not appear. Accordingly, a need continues to exist for causing such pages to appear, while maintaining the simplicity of a single window environment.

SUMMARY OF THE INVENTION

According to various implementations of the present invention, a request to open a new browser window is either allowed or ignored, depending on whether the request was generated in response to user input. If the request was not generated in response to user input, as is the case with pop-up advertisements, the request is ignored. If, on the other hand, the request was generated in response to user input, it is more likely to be important for performing some useful task, and is allowed. In such cases, in order to preserve the single window interface, the new browser window is opened as a full screen window that overlays the existing browser window. In certain implementations, the determination of whether or not a request was generated in response to user input is simplified by assuming that all requests that are generated during the loading or unloading of a page are not in response to user input and ought to be ignored. By contrast, window open requests that are generated at other times are assumed to be user-initiated and are allowed.

In one embodiment, a request to open a second browser window is received while a first browser window is displayed. The request is ignored if it was not initiated in response to a user action. The second browser window is opened if the request was initiated in response to a user action.

In an alternative embodiment, the request is ignored if it was initiated during either loading or unloading of a page in the first browser window, and the second browser window is opened if the request was initiated after loading and before unloading of a page in the first browser window.

Still other implementations include computer-readable media and apparatuses for performing the above-described methods. The above summary of the present invention is not intended to describe every implementation of the present invention. The figures and the detailed description that follow more particularly exemplify these implementations.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
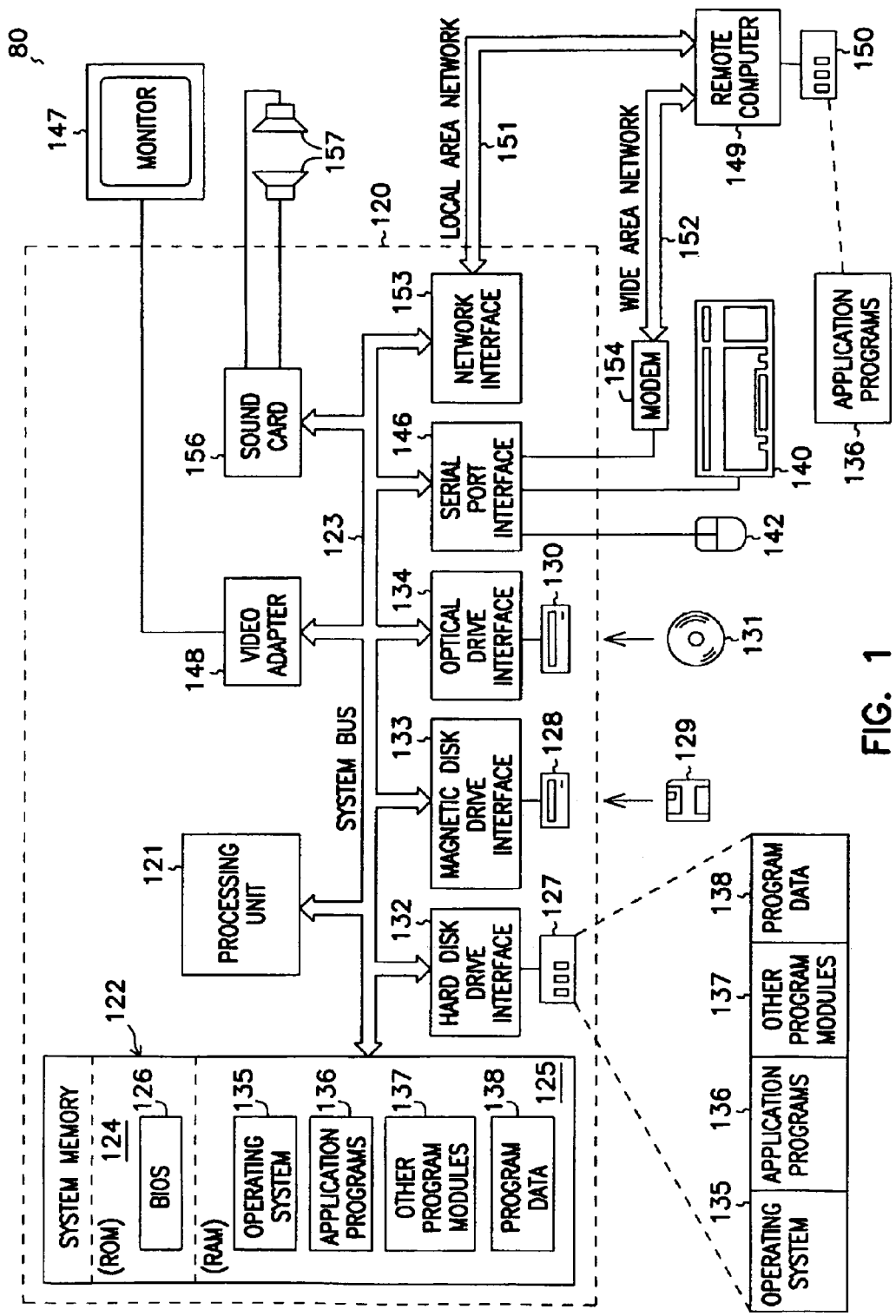
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network personal computers (PCs), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general purpose computing or information handling system 80. This embodiment includes a general purpose computing device, such as a personal computer (PC) 120, that includes a processing unit 121, a system memory 122, and a system bus 123 that operatively couples the system memory 122 and other system components to the processing unit 121. There may be only one or there may be more than one processing unit 121, such that the personal computer 120 comprises a single central processing unit (CPU), or a plurality of processing units, commonly referred to as a parallel processing environment. The computer 120 may be a conventional computer, a distributed computer, or any other type of computer; the invention is not so limited.

In other embodiments, other configurations are used in the personal computer 120. The system bus 123 may be any of several types, including a memory bus or memory controller, a peripheral bus, and a local bus, and may use any of a variety of bus architectures. The system memory 122 may also be referred to simply as the memory, and it includes a read only memory (ROM) 124 and a random access memory (RAM) 125. A basic input/output system (BIOS) 126 stored in the ROM 124, contains the basic routines that transfer information between components of the personal computer 120. The BIOS 126 also contains start-up routines for the system.

The personal computer 120 typically includes at least some form of computer-readable media. Computer-readable media can be any available media that can be accessed by the personal computer 120. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that can be used to store the desired information and that can be accessed by the personal computer 120. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included in the scope of computer readable media.

By way of example, the particular system depicted in FIG. 1 further includes a hard disk drive 127 having one or more magnetic hard disks (not shown) onto which data is stored and retrieved for reading from and writing to a hard disk interface 132, a magnetic disk drive 128 for reading from and writing to a removable magnetic disk 129, and an optical disk drive 130 for reading from and/or writing to a removable optical disk 131, such as a CD-ROM, DVD, or other optical medium. The hard disk drive 127, magnetic disk drive 128, and optical disk drive 130 are connected to the system bus 123 by a hard disk drive interface 132, a magnetic disk drive interface 133, and an optical drive interface 134, respectively. The drives 127, 128, and 130 and their associated computer readable media 129, 131 provide nonvolatile storage of computer-readable instructions, data structures, program modules, and other data for the personal computer 120.

In various embodiments, program modules are stored on the hard disk drive 127, the magnetic disk 129, the optical disk 131, ROM 124, and/or RAM 125 and may be moved among these devices, e.g., from the hard disk drive 127 to RAM 125. Program modules include an operating system 135, one or more application programs 136, other program modules 137, and/or program data 138. A user may enter commands and information into the personal computer 120 through input devices such as a keyboard 140 and a pointing device 42. Other input devices (not shown) for various embodiments include one or more devices selected from a microphone, joystick, game pad, satellite dish, scanner, or the like. These and other input devices are often connected to the processing unit 121 through a serial port interface 146 coupled to the system bus 123, but in other embodiments they are connected through other interfaces not shown in FIG. 1, such as a parallel port, a game port, or a universal serial bus (USB) interface. A monitor 147 or other display device also connects to the system bus 123 via an interface such as a video adapter 148. In some embodiments, one or more speakers 157 or other audio input transducers are driven by a sound adapter 156 connected to the system bus 123. In some embodiments, in addition to the monitor 147, the system 80 includes other peripheral output devices (not shown), such as a printer or the like.

In some embodiments, the personal computer 120 operates in a networked environment using logical connections to one or more remote computers such as a remote computer 149. The remote computer 149 may be another personal computer, a server, a router, a network PC, a peer device, or other common network node. The remote computer 149 typically includes many or all of the components described above in connection with the personal computer 120; however, only a storage device 150 is illustrated in FIG. 1. The logical connections depicted in FIG. 1 include a local area network (LAN) 151 and a wide area network (WAN) 152, both of which are shown connecting the personal computer 120 to the remote computer 149. Typical embodiments would only include one or the other. Such networking environments are commonplace in offices, enterprise-wide computer networks, intranets, and the Internet.

When placed in a LAN networking environment, the personal computer 120 connects to the local network 151 through a network interface or adapter 133. When used in a WAN networking environment, such as the Internet, the personal computer 120 typically includes a modem 154 or other means for establishing communications over the network 152. The modem 154 may be internal or external to the personal computer 120 and connects to the system bus 123 via the serial port interface 146 in the embodiment shown. In a networked environment, program modules depicted as residing within the personal computer 120 or portions thereof may be stored in the remote storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

EXAMPLE EMBODIMENTS

According to an embodiment of the present invention, an Internet appliance uses a single-window interface to interact with the user. Rather than simply ignoring all requests to open new browser windows, the Internet appliance selectively responds to some such requests by opening new browser windows, while ignoring other requests. The decision of whether to process or ignore a request for a new browser window is informed by whether the request was initiated by the user or not. In a particular embodiment, this determination is approximated by an assumption that a request occurring during the loading or unloading of a page was not user-initiated, and ought to be ignored. By contrast, requests occurring at other times are assumed to be user-initiated, and are processed. In another embodiment, instead of relying on these assumptions, the Internet appliance is configured to determine whether a request to open a new browser window was user-initiated. The Internet appliance opens new browser windows as full-screen windows in order to preserve the appearance of a single window interface.

A request to open a new browser window can occur in response to a variety of events. For example, there may be script on a page that calls a window.open( ) function, which normally causes a new browser window to be opened. Browser open requests can also occur, for example, in response to anchors in a page that have a TARGET="x" attribute, where x defines a frame that is not yet defined.

When either of these mechanisms is used to create a new browser window, the system honors the request by creating a new browser instance that navigates to the new page. The new browser instance appears directly above the existing browser window and has the same dimensions as the existing browser window. That is, all window sizing commands are ignored when opening the new browser instance—the new browser instance is always opened as a full-screen window. With the new browser instance having the same dimensions as the existing browser window, the appearance that a normal navigate has occurred is maintained. The user is not aware of the creation of a new browser instance. In addition, because the new browser instance is created over the existing instance, the new browser instance can communicate via the HTML Document Object Model (DOM) with the existing browser instance, as required by most common applications that use browser open requests to open additional browser instances. Without this capability, a page would appear to function properly, but would not accomplish the task of communicating actions back to the page that opened it.

Figure 2:
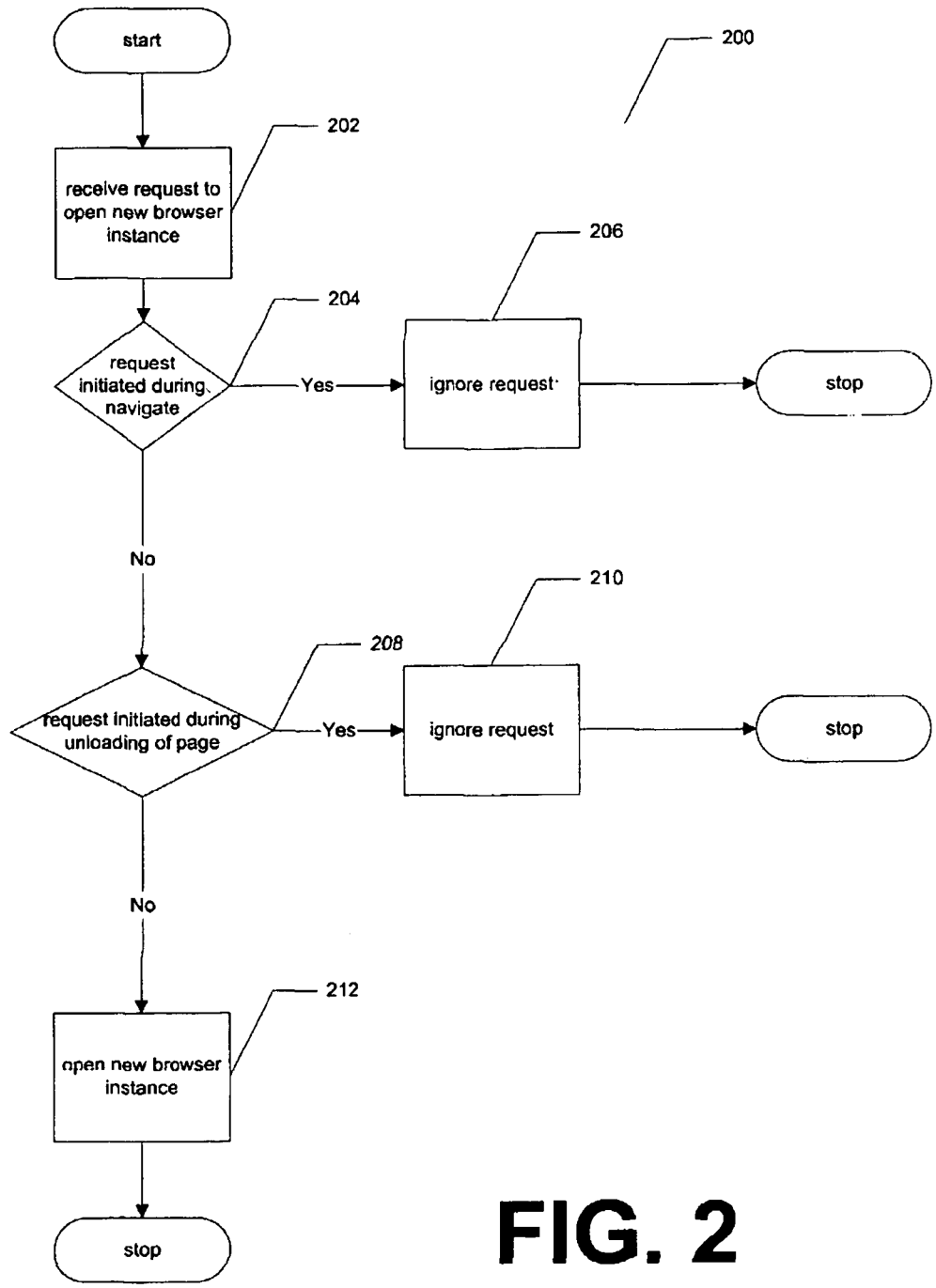
FIG. 2 is a flowchart depicting an example method for processing a request to open a new browser instance, according to a particular embodiment of the present invention FIG. 3 conceptually depicts an example series of navigation operations and the manner in which they are handled according to an operational example of the present invention.

FIG. 2 is a flowchart depicting an example method 200 for processing a request to open a new browser instance, according to a particular embodiment of the present invention. First, as depicted at a block 202, the system receives a request to open a new browser instance. At a decision block 204, the system determines whether the request occurred during a navigate. If so, the request is assumed to have occurred automatically, without prior user input. Accordingly, the request is ignored at a block 206.

If the request did not occur during a navigate, the system determines whether it occurred during the unloading of a page at a decision block 208. When a page begins a navigation, the first thing that occurs is the unloading of the current page. During this event, all browser open requests are ignored at a block 210.

If the request occurred neither during a navigate nor during the unloading of a current page, it most likely occurred after the user clicked or pressed a key or keys on an element that can cause a navigation. After this point, all browser open requests are considered user initiated and are honored, as depicted at a block 212.

Browser open requests are handled in this way in order to make them appear as full screen navigates. Handling browser open requests that occur before a user specifically clicks on an element to open a new page or that occur during a page's unload sequence would cause some pages to not be accessible to the user. For example, if a request to open a new browser instance occurring during the loading of a page were handled in-place, the user would not be able to interact with the page that generated the request because the act of loading that page would cause the new browser instance to be loaded in its place. If the request occurs during the unloading of a page, the user would go to the page requested on unload, but would never get to the page that was targeted when the unload event initiated. Because these cases almost always occur in the context of advertisements, they are generally not critical to the user's web experience. To handle these requests properly, unload and load events are handled so that any browser open request that should be honored is honored only after the page has completed loading, but before new navigation has begun. That is, any new browser windows are opened only after all expected load requests are received, but before any unload events for the current page are received.

In order to maintain the single-window interface, any browser open requests that are honored at block 212 are handled by opening a new, full-screen, instance of the browser directly over the existing instance, creating the appearance that a normal page navigate occurred. Further, any requests to open dialog boxes by browser instances that are not in the foreground are hidden until the applicable browser instance is in the foreground. Similarly, any sounds that would otherwise be emitted by browser instances in the background are not played. As a result, "bleed-through" of dialog boxes and sounds is avoided.

In a particular embodiment, when a browser open request is honored, an additional instance of the browser is created, rather than handling the browser open request as a standard navigate request within the existing browser instance. On a desktop browser, a browser open request causes a second instance of the browser to be created in a separate thread. With the two browser instances running on separate threads, any JScript or VBScript calls from the first instance to the second instance are marshaled by COM. Some pages make use of inter-browser scripting to have events occurring in the first browser instance affect the content of the second browser instance. It should be noted that the WINDOWS CE® operating system does not support COM marshalling. Accordingly, in such an Internet appliance using the WINDOWS CE® operating system, both browser instances are run off a single thread, an approach that does not require COM marshalling, at the cost of a negligible performance tradeoff. In the Internet appliance environment, creating an additional browser instance allows the system to maintain separate threads, e.g., for passing JScript calls from one browser instance to another, so that events occurring in one browser instance can affect the content of another browser instance. In environments with relatively limited memory resources, less recently opened browser instances are closed as necessary to free memory, keeping at least two browser instances open simultaneously so as to allow the proper functioning of the most common Internet pages making use of inter-browser communication between two pages.

In the case of a page with multiple frames, a browser open request is only handled when either all the frames have finished loading, or after the frame from which the browser open request originated has finished loading. Accordingly, in a particular embodiment, the system is aware of which frame initiated a browser open request, as well as whether that frame has finished loading. In some cases, interface pointers that are passed when a browser open request is issued can be used to determine whether the frame from which the request issued is in the fully loaded state or not.

Browser navigation is also handled in such a way as to preserve the appearance of a single-window interface. For example, a request from a browser instance to close itself, typically via a window.close( ) call, is handled by closing the browser instance and returning to the previous browser instance, unless no such previous browser instance exists. In this case, the request is ignored, as it would result in no browser instance being displayed. Likewise, any dialog boxes that give the user the option to close the browser are disabled. Even though such dialog boxes are still displayed, any requests to close the browser that issue from them are ignored.

In addition, the browser history, i.e., the list that instructs the browser which page to go to when the back and forward browser buttons are pressed, keeps track of where browser transitions occur. This history list can be built from the current browser instance or from all browser instances. In the latter case, for example, if the back button is pressed on the first page of the current browser instance and a previous browser instance exists, the system hides the current browser instance and displays the previous instance. The user then sees the window transition from the first page of the current instance to the last page of the immediately preceding instance.

Figure 3:
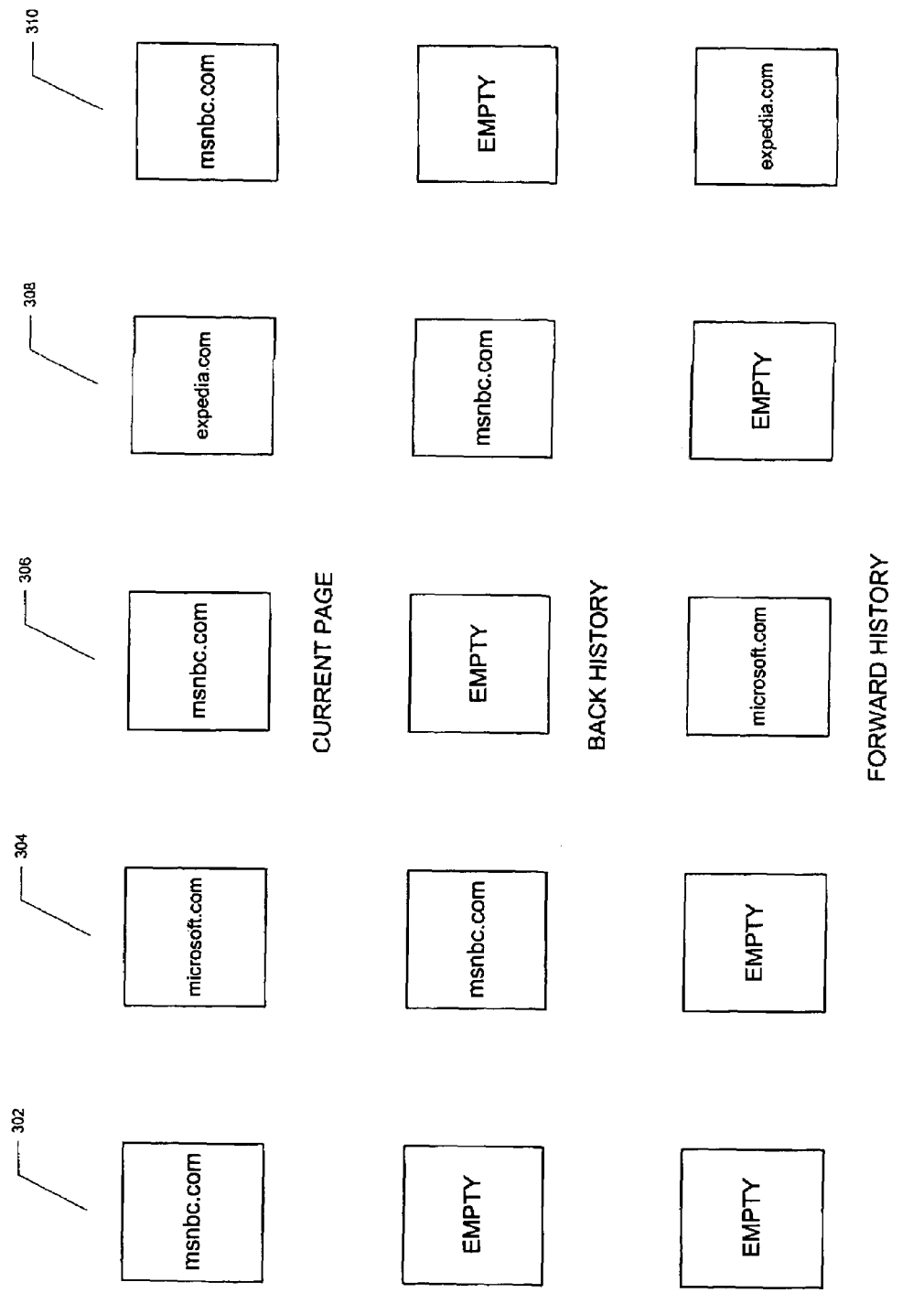

FIG. 3 conceptually depicts an example series of navigation operations and the manner in which they are handled according to an operational example of the present invention. As illustrated in FIG. 3, when building the browser history list across multiple instances, the current page on each browser instance is used as a reference point. In this operational example, the user first navigates to msnbc.com at a block 302. As denoted below block 302, the back history and forward history are both empty at this point.

Next, at a block 304, the user navigates to microsoft.com, and the back history contains the entry msnbc.com. The forward history is still empty. At a block 306, the user uses the back button on the browser to navigate back to msnbc.com; the back history thus becomes empty again. The forward history contains the entry microsoft.com.

At a block 308, the user clicks on a hyperlink that causes a browser open request to be issued for navigating to expedia.com. Although the page opens in a new window, the back history contains the entry msnbc.com, which was the page most recently visited, albeit from a different browser instance. The forward history associated with the new browser instance is empty.

Finally, at a block 310, the user uses the back button on the browser to navigate back to msnbc.com. The back history thus becomes empty, since msnbc.com was the first page visited in this operational example. The forward history associated with this browser instance contains the entry expedia.com, the page visited immediately after (at block 308) the user visited msnbc.com at block 306.

There are situations on the World Wide Web that can result in a user being "stuck" on—unable to navigate out of—a set of Web pages. For instance, a page may contain a navigate call that occurs while it is loading in order to redirect navigation to a more appropriate page. While this feature is useful in the case of, for example, outdated links, it also prevents the browser from navigating backwards past the page containing the navigate call. To address this issue, the navigate call is converted to a window.location.replace( ) call. As a result, navigation is still redirected to the more appropriate page, but the page that originated the navigate call is removed from the history list. Thus, the browser is able to navigate backwards past that page.

In one implementation, the system is embodied in an Internet appliance that has limited memory. As this memory fills up, the oldest browser instances in the history stream are removed down to the minimum limit. Once a browser open request has occurred, this minimum limit is two so that typical communication between browsers can occur. Typical communication involves one browser instance opening up another instance to perform some action and return the results of that action back to the parent browser instance. In a particular embodiment, a low-memory management scheme is used to pre-allocate a small block of memory for emergency purposes, such as deleting browser instances in the event of low memory.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable storage medium, such as a CD-ROM, magnetic medium, ROM or RAM, or in a transmission medium such as an electronic signal. Further, as used in the claims herein, the term "module" shall mean any hardware or software component, or any combination thereof.

What is claimed is:

1. One or more computer-readable storage media comprising computer-executable instructions for implementing an Internet browser, the computer-executable instructions comprising instructions for:

receiving a request to open a second browser while a first browser is displayed;

opening the second browser if the request was initiated after receiving a load finished event for the first browser and before receiving an unload event for the first browser, wherein the second browser comprises a browser history comprising websites visited by the first browser and navigates from both the first and second browsers add to the browser history; and ignoring the request if the request was received after receiving the unload event for the first browser and before receiving the load finished event for the first browser;

wherein the browser history additionally tracks where browser transitions occur between the first and second browsers, and comprises instructions for:

detecting, in the browser history, a transition between the first and second browsers in response to a forward or back button; and hiding, in response to the detected transition, one of the first and second browsers and displaying the other.

2. The one or more computer-readable media of claim 1, wherein opening the second browser comprises instructions for:

verifying that interface pointers, configured for passage when a browser open request is issued, have been passed.

3. The one or more computer-readable media of claim 1, wherein opening the second browser comprises instructions for:

ignoring all window sizing commands and superimposing the second browser on top of the first browser.

4. The one or more computer-readable media of claim 1, additionally comprising instructions for:

after opening the second browser and before a navigate, receiving notice of the back button being pressed; and hiding, in response to the back button, the second browser and revealing, consistent with the browser history, the first browser.

5. A method, at least partially implemented by a computer for operating an Internet browser, comprising:

receiving a request to open a second browser while a first browser is displayed;

opening the second browser only in response to a user request, wherein the presence of a user request is confirmed in part by receipt of the request after a load finished event from the first browser and before an unload event from the first browser is received, wherein the second browser comprises a browser history comprising websites visited by the first browser and navigation of both the first and second browsers add to the browser history; and not opening the second browser if the request was received after the unload event from the first browser was received and before the load finished event from the first browser was received, wherein the browser history additionally tracks where browser transitions occur between the first and second browsers, and comprises instructions for:

detecting, in the browser history, a transition between the first and second browsers in response to a forward or back button; and hiding, in response to the detected transition, one of the first and second browsers and displaying the other.

6. The method of claim 5, wherein configuring the second browser comprises:

including a current page of the first browser in the back history of the second browser.

7. The method of claim 5, additionally comprising:

transitioning from the second browser to the first browser upon receiving notice of the back button.

8. The method of claim 7, wherein transitioning from the second browser to the first browser comprises:

receiving notice of the back button being pressed; and hiding, in response to the notice, the second browser to reveal the first browser.

9. The method of claim 5, additionally comprising:

maintaining a browser history, including back history and forward history, reflecting operation of multiple browsers.

10. The method of claim 5, additionally comprising:

maintaining separate threads for separate browsers; and passing calls from one browser to another browser using the separate threads, wherein events occurring in one browser can affect content of another browser.

11. A method, at least partially implemented by a computer, comprising:

opening a second browser in response to a request received by a first browser, if the request was not received during a navigate and was not received during an unloading of a page;

not opening the second browser if the request was received after an unload event from the first browser and before a load finished event from the first browser is received; and if the second browser was opened, configuring the first and second browsers with forward and back browser histories, wherein the forward and back browser histories are related such that a current page in one of the browsers is in the forward history or the back history of another of the browsers;

wherein the browser history additionally tracks where browser transitions occur between the first and second browsers, and comprises instructions for:

detecting, in the browser history, a transition between the first and second browsers in response to a forward or back button; and hiding, in response to the detected transition, one of the first and second browsers and displaying the other.

12. The method of claim 11, additionally comprising:

tracking browser transitions such that, at a transition, user selection of a forward or back button, as appropriate, results in hiding of one browser and displaying of another browser.

13. The method of claim 12, wherein the tracked browser transitions indicate, in the browser history, transitions between pages Visited by the first browser and pages visited by the second browser.

14. The method of claim 11, wherein configuring the second browser comprises:

including a current page of the first browser in the back history of the second browser.

15. The method of claim 11, additionally comprising:

transitioning from the second browser to the first browser upon use of the back button.

16. The method of claim 11, additionally comprising:

maintaining a browser history, including back history and forward history, wherein the browser history comprises information obtained from operation of multiple browsers.

* * * * *

UNITED STATES PATENT AND TRADEMARK OFFICE
CERTIFICATE OF CORRECTION

| | | |
|---|---|---|
| PATENT NO. | : 7,421,657 B1 | Page 1 of 1 |
| APPLICATION NO. | : 09/712064 | |
| DATED | : September 2, 2008 | |
| INVENTOR(S) | : David Dawson-Granados et al. | |

It is certified that error appears in the above-identified patent and that said Letters Patent is hereby corrected as shown below:

In column 10, line 52, in Claim 13, delete "Visited" and insert -- visited --, therefor.

Signed and Sealed this

Twenty-sixth Day of April, 2011

David J. Kappos
*Director of the United States Patent and Trademark Office*